(12) United States Patent
Zhao et al.

(10) Patent No.: US 10,446,921 B2
(45) Date of Patent: Oct. 15, 2019

(54) COMPOSITE MATERIAL, SHELL FOR MOBILE DEVICE, THEIR MANUFACTURING METHODS, AND MOBILE DEVICE

(71) Applicant: BYD COMPANY LIMITED, Shenzhen, Guangdong (CN)

(72) Inventors: Lihong Zhao, Shenzhen (CN); Wenhai Luo, Shenzhen (CN); Dingwen Mao, Shenzhen (CN)

(73) Assignee: BYD COMPANY LIMITED, Shenzhen, Guangdong (CN)

( * ) Notice: Subject to any disclaimer, the term of this patent is extended or adjusted under 35 U.S.C. 154(b) by 306 days.

(21) Appl. No.: 15/532,882

(22) PCT Filed: Dec. 1, 2015

(86) PCT No.: PCT/CN2015/096175
§ 371 (c)(1),
(2) Date: Jun. 2, 2017

(87) PCT Pub. No.: WO2016/086853
PCT Pub. Date: Jun. 9, 2016

(65) Prior Publication Data
US 2017/0346175 A1    Nov. 30, 2017

(30) Foreign Application Priority Data

Dec. 3, 2014  (CN) .......................... 2014 1 0725132

(51) Int. Cl.
*H01Q 1/40* (2006.01)
*H01Q 1/24* (2006.01)
(Continued)

(52) U.S. Cl.
CPC ............... *H01Q 1/40* (2013.01); *B32B 3/266* (2013.01); *B32B 5/02* (2013.01); *B32B 7/12* (2013.01);
(Continued)

(58) Field of Classification Search
CPC . H01Q 1/40; H01Q 1/243; C23F 1/32; H04M 1/0283; B32B 5/02; B32B 7/12;
(Continued)

(56) References Cited

U.S. PATENT DOCUMENTS

2011/0091738 A1    4/2011  Tachibana et al.
2011/0297549 A1    12/2011 Chen et al.
(Continued)

FOREIGN PATENT DOCUMENTS

CN          102316687 A      1/2012
CN           10236044 A      2/2012
(Continued)

OTHER PUBLICATIONS

International Search Report and Written Opinion from PCT/CN2015/096175 dated Mar. 8, 2016.

*Primary Examiner* — Michael C Miggins
(74) *Attorney, Agent, or Firm* — Calfee, Halter & Griswold LLP (57) ABSTRACT

Disclosed are a composite material, a shell for a mobile device, their manufacturing methods, and a mobile device. The composite material includes: a first metal substrate (100); a first resin fiber plate (200) disposed on an upper surface of the first metal substrate; an antenna layer (300) disposed on an upper surface of the first resin fiber plate; a second resin fiber plate (400) disposed on an upper surface of the antenna layer; and a second metal substrate (500) disposed on an upper surface of the second resin fiber plate.

20 Claims, 3 Drawing Sheets

(51) Int. Cl.
*B32B 5/02* (2006.01)
*B32B 7/12* (2006.01)
*B32B 15/14* (2006.01)
*B32B 15/18* (2006.01)
*B32B 15/20* (2006.01)
*B32B 3/26* (2006.01)
*C23F 1/32* (2006.01)
*H04M 1/02* (2006.01)

(52) U.S. Cl.
CPC .............. *B32B 15/14* (2013.01); *B32B 15/18* (2013.01); *B32B 15/20* (2013.01); *C23F 1/32* (2013.01); *H01Q 1/243* (2013.01); *B32B 2250/05* (2013.01); *B32B 2250/42* (2013.01); *B32B 2255/06* (2013.01); *B32B 2260/021* (2013.01); *B32B 2260/023* (2013.01); *B32B 2260/046* (2013.01); *B32B 2262/0269* (2013.01); *B32B 2262/04* (2013.01); *B32B 2262/101* (2013.01); *B32B 2451/00* (2013.01); *B32B 2457/00* (2013.01); *H04M 1/0283* (2013.01)

(58) Field of Classification Search
CPC ......... B32B 15/14; B32B 15/18; B32B 15/20; B32B 3/266; B32B 2250/42; B32B 2255/06; B32B 2255/226; B32B 2255/021; B32B 2260/023; B32B 2260/046; B32B 2262/0269; B32B 2262/04; B32B 2262/101; B32B 2451/00; B32B 2457/00; B32B 2250/05
See application file for complete search history.

(56) References Cited

U.S. PATENT DOCUMENTS

| | | |
|---|---|---|
| 2011/0317343 A1 | 12/2011 | Shin et al. |
| 2011/1317343 | 12/2011 | Jongyeon et al. |
| 2013/0082885 A1 | 4/2013 | Chiang |
| 2014/0363263 A1 | 12/2014 | Sun et al. |

FOREIGN PATENT DOCUMENTS

| | | |
|---|---|---|
| CN | 202422178 U | 9/2012 |
| CN | 202872871 U | 4/2013 |
| CN | 103660430 A | 3/2014 |
| CN | 103929910 A | 7/2014 |
| WO | 2009157458 A1 | 12/2009 |

COMPOSITE MATERIAL, SHELL FOR MOBILE DEVICE, THEIR MANUFACTURING METHODS, AND MOBILE DEVICE

CROSS-REFERENCE TO RELATED APPLICATION

This application is a U.S. national phase application of International Application No. PCT/CN2015/096175, filed on Dec. 1, 2015, which claims a priority to and benefits of Chinese Patent Application Serial No. 201410725132.0, filed with the State Intellectual Property Office of P. R. China on Dec. 3, 2014, the entire contents of which are incorporated herein by reference.

FIELD

The present disclosure relates to a material field, more particularly to a composite material, a shell for a mobile device, and their manufacturing methods, as well as a mobile device.

BACKGROUND

The existing mobile device with a metal body can only be provided with an antenna inside, eg., the internal antenna is formed by electroplating an antenna pattern or printing conductive ink on a plastic substrate. The antenna is arranged at an upper or lower end of the mobile device, or at a broadside. In order to export a signal, upper and lower ends of back shell is assembled with glass, or the back shell is provided with a groove filled with the insulating plastic, so as to avoid the signal from being disturbed and to allow the signal to be exported. Therefore, it is impossible for a mobile device with the antenna arranged in the above described way to be of a metallic appearance as a whole. At the same time, the groove arranged therefrom not only adversely affects aesthetics, but also makes the signal intensity reduced due to partitioned metal body.

SUMMARY

According to a first aspect of the present disclosure, there is provided a composite material, comprising:
 a first metal substrate;
 a first resin fibre plate disposed on an upper surface of the first metal substrate;
 an antenna layer disposed on an upper surface of the first resin fibre plate;
 a second resin fibre plate disposed on an upper surface of the antenna layer; and
 a second metal substrate disposed on an upper surface of the second resin fibre plate.

Such composite material is of a data transmitting function, and thus may be used to manufacture a mobile device shell. It may not only improve data transmission quality, but also improve product's aesthetics. According to embodiments of the present disclosure, the first resin fibre plate and the second resin fibre plate are disposed at the upper and lower surfaces of the antenna layer, so as to prevent electric conduction, and thereby facilitating the data transmission. In addition, the metal substrate is disposed at the outer surface of the resin fibre plate, so that it may not only enhance intensity of the composite material, but also allow a metallic appearance as a whole, and thereby improving product's aesthetics.

According to a second aspect of the present disclosure, there is provided a shell for mobile device manufactured with the composite material described above. As the composite material is of a metallic appearance, it is conveniently for the mobile device to be designed into a metallic appearance as a whole, and thereby improving quality and aesthetics of the mobile device. Meanwhile, as the composite material also has the antenna layer comprising a data transmitting module, a mobile device manufactured with the composite material is of the data transmission function, by which there is no need to install a built-in antenna. As a result, it may dispose the antenna outside the mobile device with a shell manufactured with the composite material according to embodiments of the present disclosure, so that it may not only further improve the data transmission function, but also improve the mobile device's aesthetics.

According to a third aspect of the present disclosure, there is provided a mobile device, comprising the shell described above. According to embodiments of the present disclosure, the mobile device is at least one of a mobile phone and a tablet computer. Therefore, the mobile device with the shell manufactured with the composite material described above may have the metallic appearance as a whole and be provided with an antenna outside the metal body. As a result, it may not only improve the data transmission quality and appearance of the mobile device, but also improve integrated quality of the mobile device.

According to a fourth aspect of the present disclosure, there is provided a method for preparing the composite material, comprising:
 providing a first metal substrate, a second metal substrate, a first resin fibre plate, a second fibre plate and an antenna layer; and
 subjecting the first metal substrate, the second metal substrate, the first resin fibre plate, the second fibre plate and the antenna layer to hot-pressure treatment in accordance with a predetermined order, so as to obtain the composite material.

According to embodiments of the present disclosure, the first metal substrate, the second metal substrate and the antenna layer are independently obtained by the following steps:
 washing a metal sheet to obtain a washed metal sheet;
 polishing the washed metal sheet to obtain a polished metal sheet;
 subjecting the polished metal sheet to oxidising treatment to obtain an oxidised metal sheet; and
 corroding the oxidised metal sheet to obtain a corroded metal sheet.

Therefore, by processing the metal sheet with the above steps, a binding force of the metal sheet may be further improved, especially the binding force between the metal sheet and the resin fibre, and thereby improving the intensity of the composite material.

According to a fifth aspect of the present disclosure, there is provided a method for manufacturing the shell for the mobile device, comprising:
 providing the composite material described above or preparing the composite material according to the method described above; and
 cutting the composite material into a predetermined shape so as to obtain the shell for the mobile device.

Therefore, the shell for the mobile device may be effectively obtained by the above-described method. As manufactured with the composite material being of the data transmission function, the shell for the mobile device is of the data transmission function, and thus there is no need to dispose an antenna for data transmission inside the shell for the mobile device. As a result, it may dispose the antenna outside the mobile device with a shell manufactured with the composite material according to embodiments of the present disclosure, so that it may not only further improve the data transmission function, but also improve the mobile device's aesthetics. In addition, as the composite material is of a metallic appearance, it is conveniently for the mobile device to be designed into a metallic appearance as a whole, and thereby improving quality and aesthetics of the mobile device.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "length," "width," "thickness," "upper," "lower," "front," "rear," "left," "right," "vertical," "horizontal," "top," "bottom," "inner," and "outer" should be construed to refer to the orientation as then described or as shown in the drawings under discussion. These relative terms are for convenience of description and do not require that the present disclosure be constructed or operated in a particular orientation, thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means at least two, e.g. two, three and so on, unless specified otherwise.

In the description of the present disclosure, it should be understood that, unless specified or limited otherwise, the terms "mounted," "supported," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Figure 1:
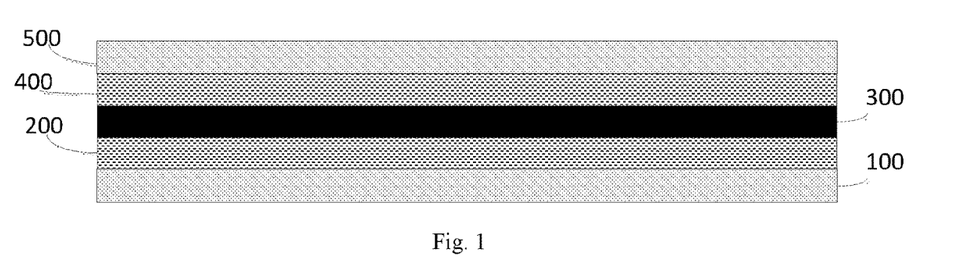
FIG. 1 is a schematic view showing a composite material according to an embodiment of the present disclosure.

According to a first aspect of the present disclosure, there is provided a composite material. As shown in FIG. 1, the composite material comprises: a first metal substrate 100, a first resin fibre plate 200, an antenna layer 300, a second resin fibre plate 400, and a second metal substrate 500. Specifically, the first resin fibre plate 200 is disposed on an upper surface of the first metal substrate 100; the antenna layer 300 is disposed on an upper surface of the first resin fibre plate 200; the second resin fibre plate 400 is disposed on an upper surface of the antenna layer 300; and the second metal substrate 500 is disposed on an upper surface of the second resin fibre plate 400.

Such composite material is of a data transmitting function, and thus may be used to manufacture a mobile device shell. It may not only improve data transmission quality, but also improve product's aesthetics. According to embodiments of the present disclosure, the first resin fibre plate and the second resin fibre plate are disposed at the upper and lower surfaces of the antenna layer, so as to prevent electric conduction, and thereby facilitating the data transmission. In addition, the metal substrate is disposed at the outer surface of the resin fibre plate, so that it may not only enhance intensity of the composite material, but also allow a metallic appearance as a whole, and thereby improving product's aesthetics.

According to an embodiment of the present disclosure, the antenna layer is provided with a data transmitting module. According to an embodiment of the present disclosure, the data transmitting module comprises at least one selected from a global system for mobile communication (GSM) module, a Bluetooth module, a wireless fidelity (WIFI) module and a global positioning system (GPS) module, so that the composite material may be of the data transmission function based on the above-described module, and thereby improving the composite material' function. Meanwhile, the composite material with the above-described structure may further improve data exporting and receiving performances of the data transmitting module.

According to an embodiment of the present disclosure, the composite material with the above-described structure may be used to manufacture a component of the mobile device, so as to improve data exporting and receiving performance of the mobile device.

According to an embodiment of the present disclosure, the first metal substrate, the second metal substrate and the antenna layer are independently made of at least one of aluminum, magnesium, titanium, aluminum alloy, magnesium alloy, titanium and stainless steel, so that the composite material may be of an improved applicable, and thereby meeting more requirements.

According to an embodiment of the present disclosure, the first metal substrate, the second metal substrate and the antenna layer are made of aluminum alloy. According to an embodiment of the present disclosure, the aluminum alloy may be at least one of 6 series aluminum alloy and 5 series aluminum alloy, so as to facilitate forming the data transmitting module on the antenna layer and to improve quality of the composite sheet. According to an embodiment of the present disclosure, the 6 series aluminum alloy may be at least one of 6061 aluminum alloy and 6063 aluminum alloy, so as to further improve quality of the composite material.

According to an embodiment of the present disclosure, the first resin fibre plate and the second resin fibre plate independently comprise a non-conducting fibre, so that the resin fibre may be of an insulating property, and thereby preventing the data transmitting module in the antenna layer from being conductive and transmitting electricity to the metal the metal substrate, as well as improving data transmitting performance of the antenna layer and safety of the composite material.

According to an embodiment of the present disclosure, the non-conducting fibre is at least one of a glass fibre, a Kevlar fibre and a cellulosic fibre, so as to further improve quality of the resin fibre.

Figure 2:
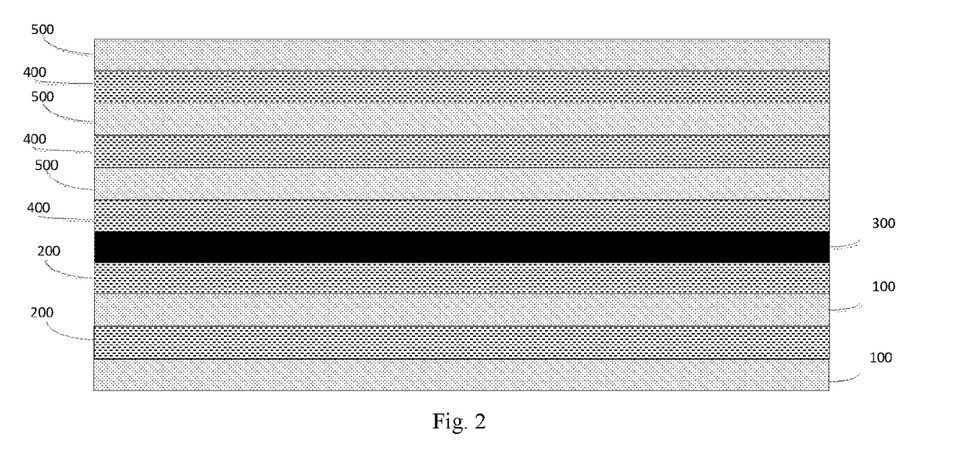
FIG. 2 is a schematic view showing a composite material according to another embodiment of the present disclosure.

According to embodiments of the present disclosure, the composite material may further comprise: a plurality of the resin fibre plates and a plurality of the metal substrates, alternately disposed in contact with a lower surface of the first metal substrate and on the upper surface of the second metal substrate, respectively, as shown in FIG. 2, so that the composite material may be of an enlarged thickness and an enhanced intensity.

Therefore, for the composite material according to embodiments of the present disclosure, the plurality of the resin fibre plates and the plurality of the metal substrates may be alternately disposed on the upper surface of the antenna layer and in contact with the lower surface of the antenna layer, respectively, with the resin fibre plates being in contact with both surfaces of the antenna layer and the metal substrates being upper and lower surfaces of the finally-formed composite material, such that it may meet requirements to thickness for the composite material by means of alternately disposing the plurality of the resin fibre plates and the plurality of the metal substrates, and thereby further improving performances of the composite material, such as weight, aesthetics and integrated quality.

According the above embodiment of the present disclosure, the composite material may be of a specific structure arranged in a manner that a plurality of combinations, each comprising one resin fibre plate and one metal substrate, is disposed on the upper surface and in contact with the lower surface of the antenna layer, in which the number of the combinations disposed on the upper surface may be different from that disposed in contact with the lower surface. As a result, for the composite material according to the above embodiment of the present disclosure, the antenna layer may be not disposed in the middle of the composite material. According to an embodiment of the present disclosure, the composite material described above may be of a structure meeting various requirements to the antenna layer, so as to integrate requirements to various antennas, and thereby achieving different appearances and thicknesses.

Figure 3:
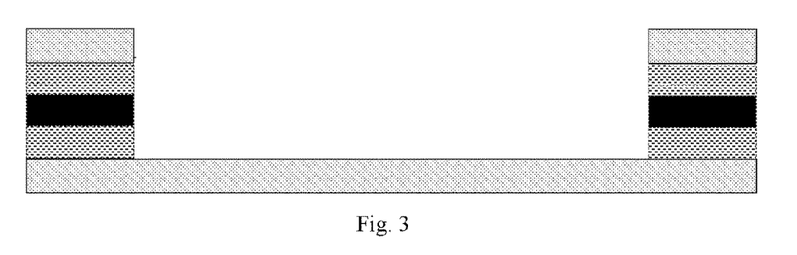
FIG. 3 is a schematic view showing a shell for a mobile device according to an embodiment of the present disclosure.

According to a second aspect of the present disclosure, there is provided a shell for a mobile device manufactured with the composite material described above. According to an embodiment of the present disclosure, the shell for the mobile device manufactured with the composite material is shown as FIG. 3. As the composite material is of a metallic appearance, it is conveniently for the mobile device to be designed into a metallic appearance as a whole, and thereby improving quality and aesthetics of the mobile device. Meanwhile, as the composite material also has the antenna layer comprising a data transmitting module, a mobile device manufactured with the composite material is of the data transmission function, by which there is no need to install a built-in antenna. As a result, it may dispose the antenna outside the mobile device with a shell manufactured with the composite material according to embodiments of the present disclosure, so that it may not only further improve the data transmission function, but also improve the mobile device's aesthetics.

According to an embodiment of the present disclosure, advantages of the composite material according to embodiments described above are also applicable to the shell for the mobile device, which is not described in detail herein.

According to a third aspect of the present disclosure, there is provided a mobile device, comprising the shell described above. According to an embodiment of the present disclosure, the mobile device is at least one of a mobile phone and a tablet computer. Therefore, the mobile device with the shell manufactured with the composite material described above may have the metallic appearance as a whole and be provided with an antenna outside the metal body. As a result, it may not only improve the data transmission quality and appearance of the mobile device, but also improve integrated quality of the mobile device.

According to a fourth aspect of the present disclosure, there is provided a method for preparing the composite material described above, comprising:

providing a first metal substrate, a second metal substrate, a first resin fibre plate, a second fibre plate and an antenna layer; and subjecting the first metal substrate, the second metal substrate, the first resin fibre plate, the second fibre plate and the antenna layer to hot-pressure treatment in accordance with a predetermined order, so as to obtain the composite material.

According to an embodiment of the present disclosure, the first metal substrate, the second metal substrate and the antenna layer are independently obtained by the following steps:

washing a metal sheet to obtain a washed metal sheet;

polishing the washed metal sheet to obtain a polished metal sheet;

subjecting the polished metal sheet to oxidising treatment to obtain an oxidised metal sheet; and corroding the oxidised metal sheet to obtain a corroded metal sheet.

Therefore, by processing the metal sheet with the above steps, an binding force of the metal sheet may be further improved, especially the binding force between the metal sheet and the resin fibre, and thereby improving the intensity of the composite material.

According to an embodiment of the present disclosure, the metal sheet is washed by:

washing with a degreaser having a concentration of 40 g/L to 50 g/L for 4 min to 6 min followed by water-washing; etching with NaOH solution having a concentration of 40 g/L to 80 g/L for 5 seconds to 30 seconds followed by water-washing; and neutralizing with $HNO_3$ solution having a concentration of 50 ml/L to 100 ml/L followed by water-washing, so that the metal sheet may be degreased and purified, so as to facilitate subsequent chemical treatment to the metal sheet, and thereby finally improving binding force between the composite material made of the metal sheet and other materials, as well as improving quality and intensity of the composite material.

According to an embodiment of the present disclosure, the washed metal sheet is polished in a chemical manner such that the metal sheet may be of a surface with reduce roughness and increased flatness. According to an embodiment of the present disclosure, the washed metal sheet is polished by: immerging into a mixed solution of $H_3PO_4$ and $H_2SO_4$ for 20 seconds to 50 seconds followed by water-washing; and neutralizing with $HNO_3$ solution having a concentration of 150 ml/L to 200 ml/L, so that surfaces of the washed metal sheet may be polished in the chemical manner effectively, so as to increase flatness of the metal sheet, and thereby improving the binding force when the composite material is formed, and thus making a preparation for improving intensity and quality of the composite material.

According to an embodiment of the present disclosure, the mixed solution of $H_3PO_4$ and $H_2SO_4$, i.e., a chemically-polishing solution, comprises $H_3PO_4$ having a concentration of 600 ml/L to 800 ml/L and $H_2SO_4$ having a concentration of 150 ml/L to 250 ml/L, so that polishing efficiency may be significantly improved by using the chemically-polishing solution with the above-described concentration, thereby avoiding corrosion from being too fast and excessively within a local region and thus controlling a period of polishing.

According to an embodiment of the present disclosure, the polished metal sheet is oxidised in an oxidation tank containing 200 ml/L $H_2SO_4$, under an oxidation voltage of 13 V to 16 V for an oxidation time of 30 min to 50 min, so that a layer of oxidation film may be formed on the surface of the metal sheet.

According to an embodiment of the present disclosure, the metal sheet with an oxidation film is further corroded, so that the metal sheet may be of a surface with enhanced roughness, and of an enhanced binding force. According to an embodiment of the present disclosure, the oxidised metal sheet is corroded by: immersing into an alkaline solution and an acid solution, to obtain an immersed metal sheet; and drying the immersed metal sheet at a temperature of 55 Celsius degree to 85 Celsius degree for 10 min to 30 min, so that the metal sheet may be of a surface with a certain of roughness, and thereby improving the binding force between the metal sheet and its adjacent resin fibre plate, as well as finally improving intensity and quality of the composite material.

According to an embodiment of the present disclosure, the first metal substrate, the second metal substrate and the antenna layer may be further independently obtained by the following steps:

subsequent to washing a metal sheet to obtain a washed metal sheet and prior to polishing the washed metal sheet to obtain a polished metal sheet, or subsequent to corroding the oxidised metal sheet to obtain a corroded metal sheet, the method further comprises: applying a binder or a coupling agent on a surface of the metal sheet; and drying the metal sheet coated with the binder or the coupling agent.

Therefore, the metal sheet is washed firstly, and the surface of the metal sheet is applied with the binder or the coupling agent subsequently; and the metal sheet applied with the binder or the coupling agent is dried, so that a series of polishing treatment, oxidising treatment and corroding treatment can be omitted. According to an embodiment of the present disclosure, the binding force of the surface of the metal sheet may be enhanced by the above described method, and thereby obtaining the first metal substrate, the second metal substrate and the antenna layer, so that intensity and quality of the composite material made therefrom may be improved. Such method has advantages of comprising simplified steps, being easy to be operated, and higher efficiency.

Furthermore, the steps of applying a binder or a coupling agent on a surface of the metal sheet and drying the metal sheet applied with the binder or the coupling agent may be performed subsequent to the step of corroding the oxidised metal sheet to obtain a corroded metal sheet, so that the binding force of the surface of the metal sheet may be enhanced, so as to obtain the first metal substrate, the second metal substrate and the antenna layer, all of which have an excellent binding force, and thereby in particular improving intensity of the composite material obtained therefrom.

According to an embodiment of the present disclosure, the metal sheet applied with the binder or the coupling agent is dried at a temperature of 50 Celsius degree to 90 Celsius degree for 30 min to 50 min, so that a solvent of the binder or the coupling agent applied on the surface of the metal sheet may be efficiently evaporated, and thereby improving binding force between surfaces of the first metal substrate, the second metal substrate and the antenna layer. According to an embodiment of the present disclosure, the drying temperature is preferably not too high and the drying time is preferably not too long, which may avoid an internal chemical binding force of the binder or the coupling agent from being changed, which may result in an eliminated or reduced binding force.

According to an embodiment of the present disclosure, the used binder may be glue with resistance to strong acid and alkaline; and the coupling agent may be a silane coupling agent, such as aminosilane, epoxysilane and vinylsilane.

According to an embodiment of the present disclosure, in order to form the antenna layer of the above described composite material, a data transmitting module is formed on the antenna layer in advance, prior to the step of washing a metal sheet to obtain a washed metal sheet, so that the series of operations for improving the binding force may be performed after the data transmitting module is formed in the antenna layer, and thereby improving binding force of the antenna layer and intensity of the composite material.

According to an embodiment of the present disclosure, the first resin fibre plate and the second resin fibre plate are independently obtained by the following steps: immersing a fibre fabric into a resin so as to obtain a single-layer resin fibre plate; and overlapping a plurality of the single-layer resin fibre plates so as to obtain the first resin fibre plate and the second resin fibre plate, respectively.

Therefore, the resin fibre plate made from a fibre-reinforced resin material may be of an insulating property, and certain hardness and intensity. The resin fibre plate is formed on both upper and lower surfaces of the antenna layer, so that it may not only prevent being conductive, but also improve intensity of the antenna, and thereby enabling the antenna layer performing the data transmitting function.

According to an embodiment of the present disclosure, the resin fibre plate is made by overlapping a plurality of the single-layer resin fibre plates, and the number of the plurality of the single-layer resin fibre plates is 1 to 10, preferably 2 to 5, so as to obtain the resin fibre plate being of an appropriate thickness and a certain intensity. The resin fibre plate and the metal substrate are alternately disposed on the upper and lower surfaces of the antenna layer, respectively, so as to finally improve intensity of the composite material.

According to an embodiment of the present disclosure, the first metal substrate or the second metal substrate for manufacturing the composite material described above may independently be of a thickness of 0.1 mm to 3 mm, preferably 1 mm to 2 mm, so that it is convenient to manufacture the composite material being of an appropriate thickness and meeting requirements. According to an embodiment of the present disclosure, the number of the first metal substrates, the number of the second metal substrates, the number of the first resin fibre plates and the number of the second resin fibre plates may be adjusted, for example, the first number of the first resin fibre plates and the first number of the first metal substrates are alternately overlapped in contact with the lower surface of the antenna layer; and the second number of the second resin fibre plates and the second number of the second metal substrates are alternately overlapped on the upper surface of the antenna layer. According to an embodiment of the present disclosure, the number of the first resin fibre plates may be same with or different from that of the second resin fibre plates. The composite material with different thicknesses may be obtained, so as to meet practical requirements.

According to a fifth aspect of the present disclosure, there is provided a method for manufacturing the shell for the mobile device, comprising:

providing a composite material described above or preparing the composite material according to the method described above; and cutting the composite material into a predetermined shape so as to obtain the shell for the mobile device.

Therefore, the shell for the mobile device may be effectively obtained by the above-described method. As manufactured with the composite material being of the data transmission function, the shell for the mobile device is of the data transmission function, and thus there is no need to dispose an antenna for data transmission inside the shell for the mobile device. As a result, it may dispose the antenna outside the mobile device with a shell manufactured with the composite material according to embodiments of the present disclosure, so that it may not only further improve the data transmission function, but also improve the mobile device's aesthetics. In addition, as the composite material is of a metallic appearance, it is conveniently for the mobile device to be designed into a metallic appearance as a whole, and thereby improving quality and aesthetics of the mobile device.

According to an embodiment of the present disclosure, the method for manufacturing the shell for the mobile device may further comprise subjecting at least a portion surface of the shell for the mobile device to appearance decoration, so as to further improve appearance aesthetics of the shell for the mobile device, and thereby improving market valve of the mobile device.

According to an embodiment of the present disclosure, the appearance decoration is at least one of anodic oxidising treatment, spraying treatment, electrophoretic treatment and physical vapor deposition treatment, so as to meet requirements to different appearance representations.

Embodiment 1

Manufacturing a Shell of a Mobile Phone:

Manufacturing a metal substrate: three aluminum alloy sheets with a size of 195*95*2 $mm^3$ was selected, and independently followed by:

Washing treatment: three aluminum alloy sheets were washed by washing with a degreaser having a concentration of 40 g/L to 50 g/L for 4 min to 6 min followed by water-washing; etching with NaOH solution having a concentration of 40 g/L to 80 g/L for 5 seconds to 30 seconds followed by water-washing; and neutralizing with $HNO_3$ solution having a concentration of 50 ml/L to 100 ml/L followed by water-washing.

Polishing treatment: After subjected to the washing treatment, three aluminum alloy sheets were polished by immerging with a mixed solution of $H_3PO_4$ having a concentration of 600 ml/L to 800 ml/L and $H_2SO_4$ having a concentration of 150 ml/L to 250 ml/L for 20 seconds to 50 seconds followed by water-washing; and neutralizing with $HNO_3$ solution having a concentration of 150 ml/L to 200 ml/L.

Oxidising treatment: After subjected to the polishing treatment, three aluminum alloy sheets were oxidised in an oxidation tank containing 200 ml/L $H_2SO_4$, under an oxidation voltage of 13 V to 16 V and an oxidation temperature of 24 Celsius degree to 25 Celsius degree for an oxidation time of 30 min to 50 min.

Corroding treatment: After subjected to the oxidising treatment, three aluminum alloy sheets were corroded by immersing into an alkaline solution containing 5% of NaOH and 1% of $NaCO_3$ for 5 min, to obtain immersed metal sheets; and drying the immersed aluminum alloy sheets at a temperature of 55 Celsius degree to 85 Celsius degree for 10 min to 30 min, and marking two in three dried aluminum alloy sheets as component 1 and one in three dried aluminum alloy sheets as component 3.

Figure 4:
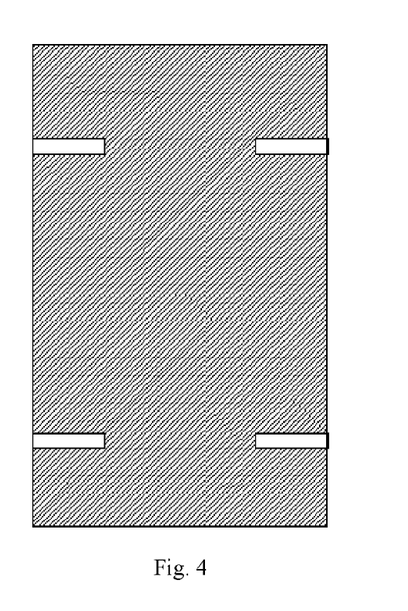
FIG. 4 is a schematic view showing an antenna layer of a composite material according to an embodiment of the present disclosure.

Manufacturing an antenna layer: After subjected to corroding treatment, obtained aluminum sheet marked as component 3 was taken as the antenna layer. A computer numerical control (CNC) process was performed to the antenna layer, so as to form a global system for mobile communication (GSM) module, a Bluetooth module, a wireless fidelity (WIFI) module and a global positioning system (GPS) module. White regions as shown in FIG. 4 were milled in accordance with antenna arrangement, so as to obtain the antenna layer, by which an antenna pattern may be formed in advance and thereby being implanted into the composite material directly in subsequent step.

Manufacturing a resin fibre plate: the resin fibre plate was obtained by overlapping three layers of glass fibres immersed into epoxy resin in advance, with fibre directions of 0 degree/90 degree/0 degree, thereby obtaining component 2. Two resin fibre plates were manufactured in this way and marked as component 2.

Figure 5:
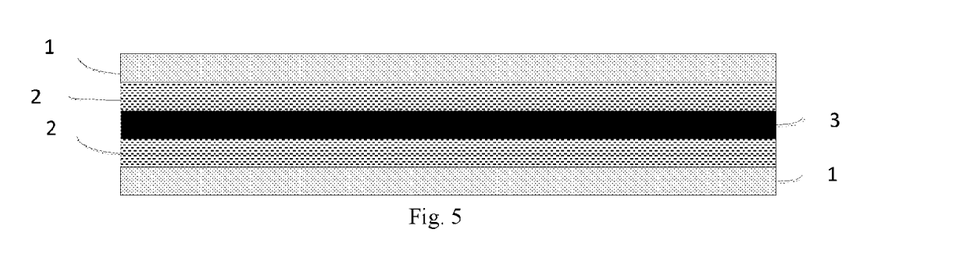
FIG. 5 is a schematic view showing a composite material obtained by a method for preparing the composite material according to an embodiment of the present disclosure.

Manufacturing the composite material: the composite material was obtained by overlapping the aluminum alloy substrate, the antenna layer and the resin fibre plate in the order as shown in FIG. 5 followed by hot-pressure treatment on a platform of a thermocompressor under a hot-pressure temperature of 180 Celsius degree, and a pressure of 10 kg for 30 min, and thereby obtaining the composite material.

Figure 6:
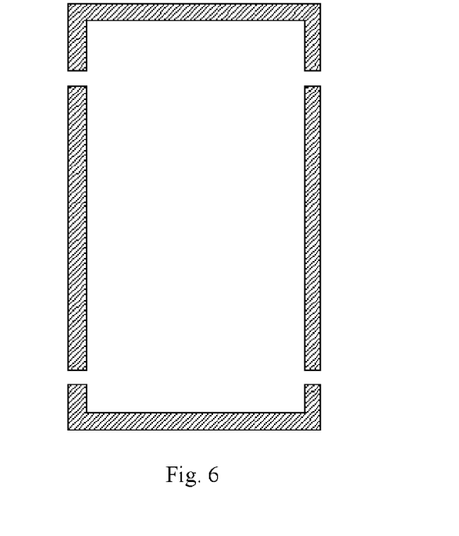
FIG. 6 is a schematic view showing an antenna layer of a shell obtained by a method for manufacturing a shell for a mobile device according to an embodiment of the present disclosure.

A shell for a mobile phone was obtained therefrom by subjecting obtained composite material to CNC process, milling its internal cavity and side pore, in which the antenna layer was of a structure as shown in FIG. 6.

The shell for the mobile phone was then subjected to spraying treatment, and thereby obtaining a product having a metallic shell as a whole.

In conclusion, the product with the shell for the mobile phone manufactured by the above method has an antenna component without a partition, so as to be of a data transmitting function, and thereby effectively avoiding an antenna signal from being shielded, as compared with the mobile phone in the related art, in which the antenna is disposed inside the shell. As a result, the product with the shell being of the above described structure may have an enhanced data transmitting function, and a metallic appearance as a whole, so that the mobile phone's appearance aesthetics and shell's intensity are improved, and thereby improving mobile phone's integrated performance.

Embodiment 2

Manufacturing a Shell of a Mobile Phone:

Manufacturing a metal substrate: three aluminum alloy sheets with a size of 195*95*2 mm³ was selected, and independently followed by:

Washing treatment: three aluminum alloy sheets were washed by washing with a degreaser having a concentration of 40 g/L to 50 g/L for 4 min to 6 min followed by water-washing; etching with NaOH solution having a concentration of 40 g/L to 80 g/L for 5 seconds to 30 seconds followed by water-washing; and neutralizing with $HNO_3$ solution having a concentration of 50 ml/L to 100 ml/L followed by water-washing eventually;

Coating with a binder: the binder was coated by applying glue resistant to strong acid and alkaline onto surfaces of three washed aluminum alloy sheets; drying at a temperature of 50 Celsius degree to 90 Celsius degree for 30 min to 50 min, and marking two in three dried aluminum alloy sheets as component 1 and one of three dried aluminum alloy sheets as component 3.

Manufacturing an antenna layer: After subjected to corroding treatment, obtained aluminum sheet marked as component 3 was taken as the antenna layer. A CNC process was performed to the antenna layer, so as to form a global system for mobile communication (GSM) module, a Bluetooth module, a wireless fidelity (WIFI) module and a global positioning system (GPS) module. White regions as shown in FIG. 4 were milled in accordance with antenna arrangement, so as to obtain the antenna layer, by which an antenna pattern may be formed in advance and thereby being implanted into the composite material directly in subsequent step.

Manufacturing a resin fibre plate: the resin fibre plate was obtained by overlapping three layers of glass fibres immersed into epoxy resin in advance, with fibre directions of 0 degree/90 degree/0 degree, thereby obtaining component 2. Two resin fibre plates were manufactured in this way and marked as component 2.

Manufacturing the composite material: the composite material was obtained by overlapping the aluminum alloy substrate, the antenna layer and the resin fibre plate in the order as shown in FIG. 5 followed by hot-pressure treatment on a platform of a thermocompressor under a hot-pressure temperature of 180 Celsius degree, and a pressure of 10 kg for 30 min, and thereby obtaining the composite material.

A shell for a mobile phone was obtained therefrom by subjecting obtained composite material to CNC process, milling its internal cavity and side pore, in which the antenna layer was of a structure as shown in FIG. 6.

The shell for the mobile phone was then subjected to anodic oxidising treatment, and thereby obtaining a product with a metallic shell as a whole having an anodic appearance.

In conclusion, the product with the shell for the mobile phone manufactured by the above method has an antenna component without a partition, so as to be of a data transmitting function, and thereby effectively avoiding an antenna signal from being shielded, as compared with the mobile phone in the related art, in which the antenna is disposed inside the shell. As a result, the product with the shell being of the above described structure may have an enhanced data transmitting function, and a metallic appearance as a whole, so that the mobile phone's appearance aesthetics and shell's intensity are improved, and thereby improving mobile phone's integrated performance.

Embodiment 3

Manufacturing a Shell of a Mobile Phone:

Manufacturing a metal substrate: three aluminum alloy sheets with a size of 195*95*2 mm³ was selected, and independently followed by:

Washing treatment: three aluminum alloy sheets were washed by washing with a degreaser having a concentration of 40 g/L to 50 g/L for 4 min to 6 min followed by water-washing; etching with NaOH solution having a concentration of 40 g/L to 80 g/L for 5 seconds to 30 seconds followed by water-washing; and neutralizing with $HNO_3$ solution having a concentration of 50 ml/L to 100 ml/L followed by water-washing.

Polishing treatment: After subjected to the washing treatment, three aluminum alloy sheets were polished by immerging with a mixed solution of $H_3PO_4$ having a concentration of 600 ml/L to 800 ml/L and $H_2SO_4$ having a concentration of 150 ml/L to 250 ml/L for 20 seconds to 50 seconds followed by water-washing; and neutralizing with $HNO_3$ solution having a concentration of 150 ml/L to 200 ml/L.

Oxidising treatment: After subjected to the polishing treatment, three aluminum alloy sheets were oxidised in an oxidation tank containing 200 ml/L $H_2SO_4$, under an oxidation voltage of 13 V to 16 V and an oxidation temperature of 24 Celsius degree to 25 Celsius degree for an oxidation time of 30 min to 50 min.

Corroding treatment: After subjected to the oxidising treatment, three aluminum alloy sheets were corroded by immersing into an alkaline solution containing 5% of NaOH and 1% of $NaCO_3$ for 5 min, to obtain immersed metal sheets; and drying the immersed aluminum alloy sheets at a temperature of 55 Celsius degree to 85 Celsius degree for 10 min to 30 min, and marking two in three dried aluminum alloy sheets as component 1 and one in three dried aluminum alloy sheets as component 3.

Manufacturing an antenna layer: After subjected to corroding treatment, obtained aluminum sheet marked as component 3 was taken as the antenna layer. A CNC process was performed to the antenna layer, so as to form a global system for mobile communication (GSM) module, a Bluetooth module, a wireless fidelity (WIFI) module and a global positioning system (GPS) module. White regions as shown in FIG. 4 were milled in accordance with antenna arrangement, so as to obtain the antenna layer, by which an antenna pattern may be formed in advance and thereby being implanted into the composite material directly in subsequent step.

Manufacturing a resin fibre plate: the resin fibre plate was obtained by overlapping three layers of glass fibres immersed into epoxy resin in advance, with fibre directions of 0 degree/90 degree/0 degree, thereby obtaining component 2. Two resin fibre plates were manufactured in this way and marked as component 2.

Figure 7:
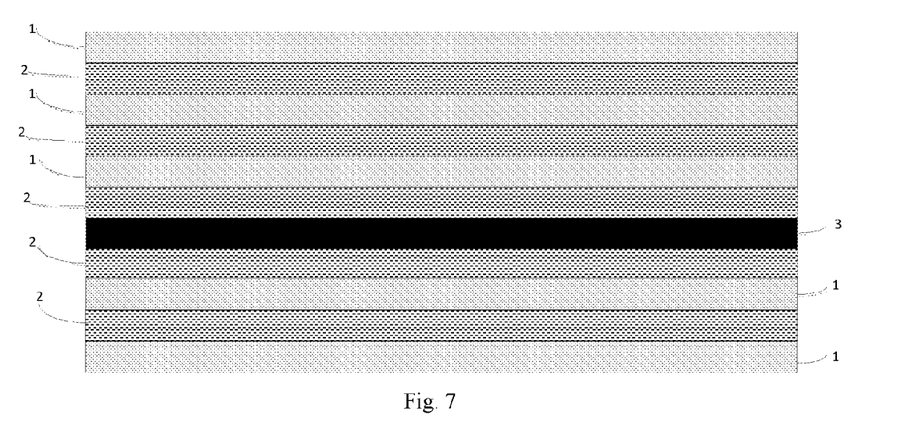
FIG. 7 is a schematic view showing a composite material obtained by a method for preparing the composite material according to another embodiment of the present disclosure.

Manufacturing the composite material: the composite material was obtained by overlapping the aluminum alloy substrate, the antenna layer and the resin fibre plate in the order as shown in FIG. 7 followed by hot-pressure treatment on a platform of a thermocompressor under a hot-pressure temperature of 180 Celsius degree, and a pressure of 10 kg for 30 min, and thereby obtaining the composite material.

A shell for a mobile phone was obtained therefrom by subjecting obtained composite material to CNC process, milling its internal cavity and side pore, in which the antenna layer was of a structure as shown in FIG. 6.

The shell for the mobile phone was then subjected to electrophoresis treatment, and thereby obtaining a product having a metallic shell as a whole.

In conclusion, the product with the shell for the mobile phone manufactured by the above method has an antenna component without a partition, so as to be of a data transmitting function, and thereby effectively avoiding an antenna signal from being shielded, as compared with the mobile phone in the related art, in which the antenna is disposed inside the shell. As a result, the product with the shell being of the above described structure may have an enhanced data transmitting function, and a metallic appearance as a whole, so that the mobile phone's appearance aesthetics and shell's intensity are improved, and thereby improving mobile phone's integrated performance.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A composite material, comprising:
   a first metal substrate;
   a first resin fibre plate disposed on an upper surface of the first metal substrate;
   an antenna layer disposed on an upper surface of the first resin fibre plate;
   a second resin fibre plate disposed on an upper surface of the antenna layer; and
   a second metal substrate disposed on an upper surface of the second resin fibre plate.

2. The composite material according to claim 1, further comprising:
   a plurality of the resin fibre plates and a plurality of the metal substrates, alternately disposed in contact with a lower surface of the first metal substrate and on the upper surface of the second metal substrate, respectively.

3. The composite material according to claim 1, wherein the antenna layer is provided with a data transmitting module.

4. The composite material according to claim 3, wherein the data transmitting module comprises a global system for mobile communication (GSM) module, a Bluetooth module, a wireless fidelity (WIFI) module, a global positioning system (GPS) module, or combinations thereof.

5. The composite material according to claim 1, wherein the first metal substrate, the second metal substrate and the antenna layer are independently made of aluminum, magnesium, titanium, aluminum alloy, magnesium alloy, titanium, stainless steel, or combinations thereof.

6. The composite materials according to claim 5, wherein the aluminum alloy is at least one of 6 series aluminum alloy and 5 series aluminum alloy.

7. The composite materials according to claim 5, wherein the 6 series aluminum alloy is at least one of 6061 aluminum alloy and 6063 aluminum alloy.

8. The composite material according to claim 1, wherein the first resin fibre plate and the second resin fibre plate independently comprise a non-conducting fibre.

9. The composite material according to claim 8, wherein the non-conducting fibre is a glass fibre, a Kevlar fibre, a cellulosic fibre, or combinations thereof.

10. A method for manufacturing a composite material, comprising:
    a first metal substrate;
    a first resin fibre plate disposed on an upper surface of the first metal substrate;
    an antenna layer disposed on an upper surface of the first resin fibre plate;
    a second resin fibre plate disposed on an upper surface of the antenna layer; and
    a second metal substrate disposed on an upper surface of the second resin fibre plate,
    wherein the method comprises:
    providing the first metal substrate, the second metal substrate, the first resin fibre plate, the second fibre plate and the antenna layer; and
    subjecting the first metal substrate, the second metal substrate, the first resin fibre plate, the second fibre plate and the antenna layer to hot-pressure treatment in accordance with a predetermined order, so as to obtain the composite material.

11. The method according to claim 10, wherein the first resin fibre plate and the second resin fibre plate are independently obtained by the following steps:
    immersing a fibre fabric into a resin so as to obtain a single-layer resin fibre plate; and
    overlapping a plurality of the single-layer resin fibre plates so as to obtain the first resin fibre plate and the second resin fibre plate.

12. The method according to claim 10, wherein the first metal substrate, the second metal substrate and the antenna layer are independently obtained by the following steps:

washing a metal sheet to obtain a washed metal sheet;
polishing the washed metal sheet to obtain a polished metal sheet;
subjecting the polished metal sheet to oxidising treatment to obtain an oxidised metal sheet; and
corroding the oxidised metal sheet to obtain a corroded metal sheet.

13. The method according to claim 12, wherein the metal sheet is washed by:
   washing with a degreaser having a concentration of 40 g/L to 50 g/L for 4 min to 6 min followed by water-washing;
   etching with NaOH solution having a concentration of 40 g/L to 80 g/L for 5 seconds to 30 seconds followed by water-washing; and
   neutralizing with $HNO_3$ solution having a concentration of 50 ml/L to 100 ml/L followed by water-washing.

14. The method according to claim 12, wherein the polished metal sheet is oxidised in an oxidation tank containing 200 ml/L $H_2SO_4$, under an oxidation voltage of 13 V to 16 V for an oxidation time of 30 min to 50 min.

15. The method according to claim 12, wherein the oxidised metal sheet is corroded by:
   immersing into an alkaline solution and an acid solution, to obtain an immersed metal sheet; and
   drying the immersed metal sheet at a temperature of 55 Celsius degree to 85 Celsius degree for 10 min to 30 min.

16. The method according to claim 12, wherein subsequent to the step of washing a metal sheet to obtain a washed metal sheet and prior to the step of polishing the washed metal sheet to obtain a polished metal sheet, or subsequent to the step of corroding the oxidised metal sheet to obtain a corroded metal sheet, the method further comprises:
   applying a binder or a coupling agent on a surface of the metal sheet; and
   drying the metal sheet applied with the binder or the coupling agent.

17. The method according to claim 16, wherein the metal sheet applied with the binder or the coupling agent is dried at a temperature of 50 Celsius degree to 90 Celsius degree for 30 min to 50 min.

18. The method according to claim 12, wherein prior to the step of washing a metal sheet to obtain a washed metal sheet, a data transmitting module is formed in the antenna layer in advance.

19. The method according to claim 12, wherein the washed metal sheet is polished by:
   immerging into a mixed solution of $H_3PO_4$ and $H_2SO_4$ for 20 seconds to 50 seconds followed by water-washing; and
   neutralizing with $HNO_3$ solution having a concentration of 150 ml/L to 200 ml/L.

20. The method according to claim 19, wherein the mixed solution of $H_3PO_4$ and $H_2SO_4$ comprises $H_3PO_4$ having a concentration of 600 ml/L to 800 ml/L and $H_2SO_4$ having a concentration of 150 ml/L to 250 ml/L.

\* \* \* \* \*